3,705,101
NEUTRON-ABSORBING MATERIAL AND METHOD OF MANUFACTURE
Paul Blum, Saint-Genis-Laval, Jacques Lefrancois, Fontenay-aux-Roses, and Louis Vinarnick, Gif-sur-Yvette, France, assignors to Commissariat a l'Energie Atomique, Paris, and Societe Lyonnaise de Plomberie Industrielle, Lyon, France
Filed Mar. 27, 1968, Ser. No. 716,380
Claims priority, application France, June 14, 1967, 110,431
Int. Cl. G21c 7/24
U.S. Cl. 252—478  5 Claims

ABSTRACT OF THE DISCLOSURE

The neutron-absorbing material essentially comprises between 32 and 40% by weight of polyethylene, between 17 and 20% by weight of water, between 37 and 45% by weight of gypsum and approximately 1% of boron.

Figure 1:
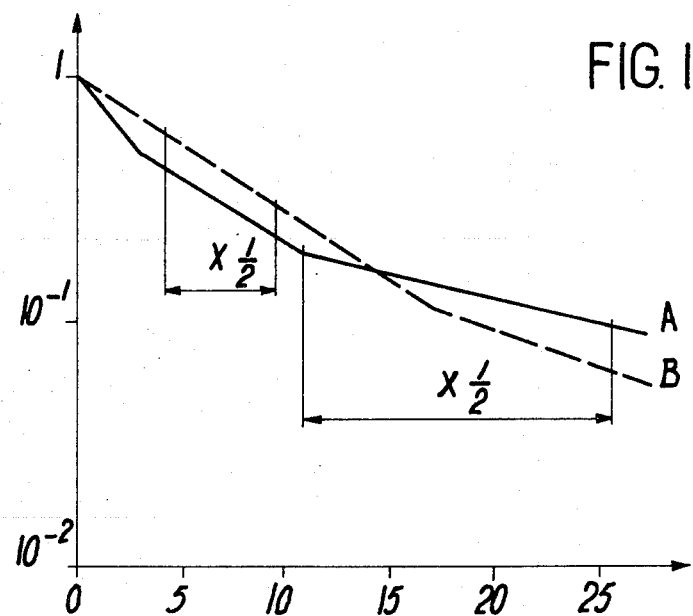

The method of preparation of the material consists in incorporating in the dry state the boron compound with the gypsum in suitable proportions, in adding the mixture of boron compound and gypsum to the mixing water in which a retarder of set may have been dissolved, in homogenizing the mixture, in incorporating polyethylene granules with the mixture, in pouring the resulting paste into a container and in tamping the poured paste.

---

This invention relates to a material which is intended to absorb either fission neutrons or neutrons emitted by a α—n or γ—n source (Pu-Be; Po-Li; Sb-Be). The invention is additionally concerned with a method for the preparation of this material.

The material according to the invention is characterized in that it comprises 32 to 40% by weight of polyethylene, 17 to 20% by weight of water, 37 to 45% by weight of gypsum and approximately 1% of boron.

It is known that, in contradistinction to gamma rays which call for heavy shielding materials (iron, lead, tungsten, uranium), the absorption of fast neutrons is mainly obtained after slowing down by light atoms (hydrogen, carbon). Indeed, it is worthy of note that three of the constituents of the material which is proposed are strongly hydrogenous:

polyethylene: —$CH_2$—$CH_2$—$CH_2$—
gypsum: $CaSO_4 \cdot 2H_2O$
make-up water: $H_2O$ The greater part of the hydrogen is supplied by the polyethylene. The gypsum makes the product fire-proof and supplies the heavy elements (sulphur, oxygen, calcium) which also play a part in the absorption of fast neutrons.

The fourth constituent, boron, has the function of absorbing slowed-down neutrons with emission of relatively low-energy photons (0.478 mev.). These constituents have also been retained for their ease of association in the contexture of the material, for their cost price which is very much lower than that of conventional materials such as massive polyethylene.

By way of indication, the absorption cross-section of the material according to the invention in the case of neutrons of 5 mev. energy is 0.133 cm.$^{-1}$ whereas the cross-section of massive polyethylene is 0.108 cm.$^{-1}$.

For the preparation of the material according to the invention, it is an advantage to make use of polyethylene in the form of granules of a few cubic millimeters, although there is nothing to prevent the use of a different granular size or a mixture comprising a number of different granular sizes even including powder. Boron is introduced in the form of boric acid (BO 3 H3) which can readily be added to the mixture but can also be introduced in other forms such as, in particular, boron carbide.

The method of preparation of the material comprises incorporating in the dry state the boron compound with the gypsum in suitable proportions, adding the mixture of boron compound and gypsum to the mixing water in which a retarder of set may have been dissolved, homogenizing the mixture, incorporating polyethylene granules with the mixture, pouring the resulting paste into a container and tamping of the poured paste.

The addition of a retarder to the mixing water is justified especially if it is desired to prepare large quantities of neutron-absorbing material. The retarder of set, which advantageously consists of monocalcium carbonate, is added in a proportion of 0.5% by weight with respect to water and a time of utilization of the mixture of 30 minutes.

If only a small quantity of material is desired and if the operations do not exceed a total time duration of approximately ten minutes, plain water is employed.

The mechanical characteristics of the material in accordance with the invention are practically the same as those of moist plaster. For example, French standard NT B 12.401 specifies in the case of plaster used in the building industry that, in the case of a fine-grain plaster, the ultimate tensile strength in bending must be higher than 5 kgs./cm.$^2$ with a proportion of water to plaster of 1:1.25 and a drying time which is reduced to two hours in a moist atmosphere. In order to determine the resistance to radiation damage of the material according to the invention, tests involving visual inspection of irradiated samples for appearance control and for approximate determination of the possible state of degradation have been carried out with a number of different neutron fluxes. The samples subjected to irradiation had the following composition:

| | Percent by weight |
|---|---|
| Polyethylene | 40 |
| Water | 17 |
| Gypsum | 37 |
| Boric acid | [1] 6 |

[1] Therefore 1% by weight of boron.

The samples had a density of the order of 1.18 and their macroscopic cross-section was 0.133 cm.$^{-1}$.

The samples subjected to irradiation were presented in the form of cylindrical blocks 20 mm. in diameter and 30 mm. in height.

In the initial state, the samples which had a weight of approximately 11 grams were white in color, had the appearance of plaster of paris in which the polyethylene appeared in the form of granules and in which the boron exhibited a yellow pigmentation.

The samples were inserted in aluminum tubes and placed in an irradiation channel. The instantaneous flux at the sample location was of the order of $5 \times 10^{11}$ neutrons/cm.$^2$.

Four samples numbered 1, 2, 3 and 4 were exposed to radiation: the irradiation times were successively: 1 hour, 2 hours, 8 hours and 100 hours.

The results obtained have been recorded in the following table. This table indicates the times of utilization of the material which would correspond to a maximum permissible service irradiation of $2.5 \times 10^8$ neutrons/cm.$^2$ second in the case of each irradiated sample and by comparison with the reactor flux, namely $5 \times 10^{11}$ neutrons/cm.$^2$/second.

| Sample No. | Irradiation time, hours | Integrated flux, n/cm.² | Time of utilization of material in normal service, hours | Observations with respect to a reference sample |
|---|---|---|---|---|
| 1 | 1 | $1.8 \times 10^{15}$ | 2,000 | Slight color change, from white to very pale grey—non degraded. |
| 2 | 2 | $3.6 \times 10^{15}$ | 4,000 | More marked color change, from white to a grey tint—non degraded. |
| 3 | 3 | $1.44 \times 10^{16}$ | 16,000 | Coloring more marked, a greyish shade—non degraded. |
| 4 | 100 | $1.8 \times 10^{17}$ | 200,000 | Dark coloring, nearly black—non degraded. |

The neutron-absorption capacity of the material according to the invention has been studied in a sample which had the following composition:

polyethylene—40% by weight
water—17% by weight
gypsum—37% by weight
boric acid—6% by weight (boron 1%)
hydrogen content—57%
macroscopic cross-section—0.133 cm.$^{-1}$.

For this study, use was made of a plutonium-beryllium source (mean energy 4.4 mev., activity of $2 \times 10^6$ neutrons per second) and a polonium-lithium source (mean energy 460 kev., activity of $1.2 \times 10^6$ neutrons per second). It has thus been possible to observe a variation in the half-value layer (HVL) in respect of two neutron energies which differ by a factor of 10.

The counter employed was a boron trifluoride counter which was placed in a paraffin-wax sphere having a radius of 6.5 cm.

Neutron absorption was studied in two different geometries. In one so-called "wide" geometry, the absorber to be studied was located at equal distance from the counter and the source (1 meter between the source and the counter). In a "storage flask" geometry, the source was placed inside a vessel formed of material to be studied. In the case just mentioned, screens of sufficient thickness were placed against the vessel, namely at a distance of 7 cm. from the center of the source. The distance from source to counter was in that case 70 cm.

FIG. 1 shows the results obtained with a plutonium-beryllium source. The thickness of the screen expressed in centimeters is plotted as abscissae and the transmission as ordinates. Curves A and B correspond respectively to the results obtained with the so-called "wide" geometry and with the so-called "storage flask" geometry. It may be deduced therefrom that, in the wide geometry, the half-value thickness ($\times \frac{1}{2}$) is equal to 14 cm., namely a macroscopic cross-section of 0.049 cm.$^{-1}$ and the tenth-value thickness ($\times \frac{1}{10}$) is 46.5 cm. In the second geometry ($\times \frac{1}{2}$) is equal to 5.5 cm., namely a macroscopic cross-section of 0.126 cm.$^{-1}$; and ($\times \frac{1}{10}$) is equal to 18.25 cm.

Figure 2:
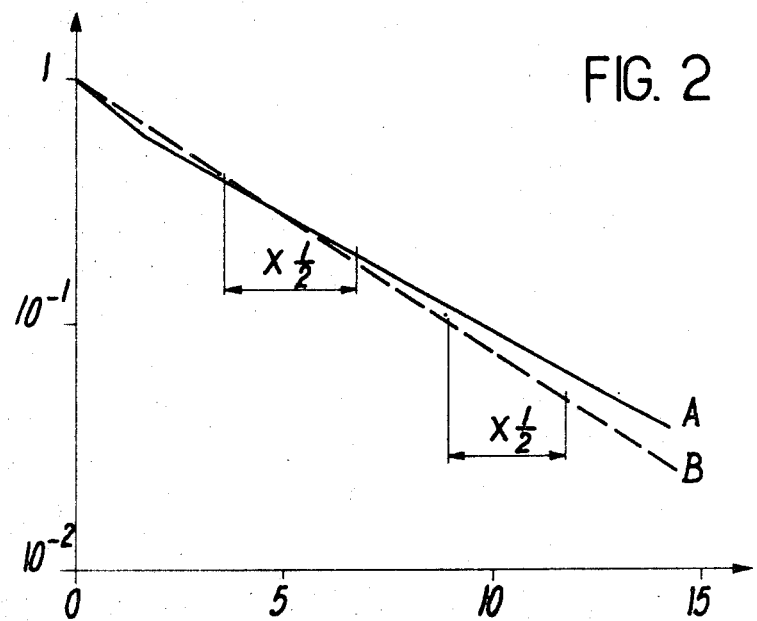

The results obtained with a polonium-lithium source in both types of geometry employed are recorded in FIG. 2. It may be deduced therefrom that, in the wide geometry, the half-valve thickness ($\times \frac{1}{2}$) is equal to 32 cm., which corresponds to a macroscopic cross-section of 0.215 cm.$^{-1}$ and the tenth-value thickness ($\times \frac{1}{10}$) is equal to 11 cm. In the second geometry, the half-value thickness ($\times \frac{1}{2}$) is 2.7 cm., the tenth-value thickness ($\times \frac{1}{10}$) is 9 cm.

The material according to the invention is essentially distinguished by its ease and convenience of use, and is therefore particularly suitable for the construction of flasks of the type employed for transporting neutron sources.

In a flask consisting of a cylinder having a diameter of 40 cm., a height of 50 cm. and a weight of 117 kilograms when empty, protection against neutron radiation has been provided by means of a material according to the invention. The flask referred-to was designed to transport a source which delivers $5 \times 10^7$ neutrons per second. At the time of the measurements under discussion, the flask contained a source which delivered $4.6 \times 10^6$ neutrons per second.

The detector employed was a boron trifluoride counter placed in a spherical paraffin-wax moderator having a radius of 11 cm. Measurement of radiation background showed this latter to be negligible.

Two series of measurements were carried out:

(1) By placing the moderator sphere in contact with the transport flask, that is to say with the counter placed at a distance of 13 cm. from the flask. This series consisted of four measurements taken at angular distances of 90° and one measurement taken overhead.

(2) By placing the counter at a distance of one meter from the external wall of the flask. This series consisted of four measurements taken at angular distances of 90°. The mean count rates obtained were: 2800 pulses in 2 minutes for the first series and 360 pulses in 3 minutes for the second series.

Taking the calibration of the counter into account, the corresponding dose rates were:

9 mrem./h. at 13 cm. from the flask edge,
0.7 mrem./h. at 1 m. from the flask edge.

The dose rate at a distance of 13 cm. above the flask was approximately 25% lower than the dose rate in the transverse section plane.

The flask was designed for a source of approximately 10 times the strength of the source employed for the measurements referred-to in the foregoing. It is therefore very clear that the degree of protection afforded is wholly sufficient to satisfy transportation standards. The application of the material according to the invention is not limited to the construction of transport flasks but extends to stationary shields of all dimensions. The material can be employed in conjunction with all shielding materials of existing types.

What is claimed is:

1. A neutron-absorbing material, consisting essentially of 32 to 40% by weight of granulated polyethylene, 17 to 20% by weight of water, 37 to 45% by weight of gypsum and approximately 1% of boron.

2. The neutron-absorbing material of claim 1, further containing a retarder which is present in the water in an amount of 0.5 per 100 by weight with respect to the water.

3. The neutron-absorbing material of claim 2, wherein the retarder is monocalcium carbonate.

4. A container for transporting nuclear fuel made of the neutron-absorbing material of claim 1.

5. A stationary shield made of the neutron-absorbing material of claim 1.

References Cited
UNITED STATES PATENTS

| | | | |
|---|---|---|---|
| 2,796,411 | 6/1957 | Zirkle et al. | 252—478 |
| 2,942,116 | 6/1960 | Axelrad | 252—478 X |
| 3,453,160 | 7/1969 | Darling et al. | 252—478 X |

CARL D. QUARFORTH, Primary Examiner

S. R. HELLMAN, Assistant Examiner

U.S. Cl. X.R.
250—108